3,277,891
ADHESIVE BANDAGES
Raymond M. Hoey, Barrington, Ill., assignor to The Kendall Company, Boston, Mass., a corporation of Massachusetts
No Drawing. Filed Sept. 30, 1964, Ser. No. 400,578
9 Claims. (Cl. 128—156)

This invention relates to adhesive bandages.

As described in the present and several past revisions of the United States Pharmacopoeia, and adhesive bandage is an individual dressing composed of an absorbent compress secured to a backing coated with a pressure-sensitive adhesive, the surface of which is protected by overlapping strips of crinoline or "other protective material." Crinoline, one of the first "protective materials" used, is a relatively open, mesh-like fabric. It served primarily to protect the adehsive surface from contact with and adherence to the wrapper material in which the bandages were packed. The areas of the adhesive surface that remained exposed through the interstices of the fabric were not protected against oxidative degradation as in the case of an adhesive surface of a tape wound upon itself in roll form.

Imperforate strips (commonly called facing members or strips) offer not only protection against sticking to the wrapper material but also protection against ageing due to exposure to the atmosphere. The appearance of the bandages faced with imperforate facing members is considerably improved over the appearance of crinoline-faced bandages. The distinct consumer preference for bandages faced with imperforate strips may be accounted for by their neater appearance and, very probably, by the impression that the imperforate facing serves as a better protection against contamination of the surfaces of the bandage that are placed in contact with the skin and wound.

In order to improve the quality of the product, in particular the shelf-life of the bandages, and to meet consumer demand, manufacturers have tried and used various materials in foil form, film form and laminates as the protective facing strips. The facing strips, in addition to protecting the adhesive surface, must satisfy a number of requirements. The adhesive bond between the adhesive surface and the surface of the facing member must not be greater than the bond between the adhesive and backing and must not be greater than the cohesive strength of the adhesive layer. The force necessary to strip the facing member from the tape must be less than that force which will permanently deform the backing in the case of plastic tapes. The mechanical adhesion and specific adhesion of the facing member to the adhesive surface must be reasonably low so that the facing and tape may be easily stripped from each other by a simple pulling force. Mechanical adhesion may be substantially reduced or eliminated by the use of facings having smooth surfaces in contact with the adhesive and for this reason may be preferred over facings having rough surfaces which may become interlocked with the adhesive layer. The tensile strength and the cohesive strength of the facing member must be sufficient to withstand the force of stripping the tape and facing from each other.

The facing material must be inert to the adhesive, i.e., there must be no objectionable interaction between the adhesive and the facing. Pressure-sensitive adhesives consist of either a multiplicity of ingredients carefully compounded or a single polymer carefully formulated to provide the balance of tack, adhesion and cohesion characteristic of pressure-sensitive adhesives. The adhesives are relatively soft, semi-solids. As is taught in Doyle 2,734,503 and confirmed in Shelley 2,877,141, it is necessary to take into account the composition of the backing in the formulation of adhesives for maximum stability of the desired balance of tack, adhesion and cohesion of the adhesive layer. The adhesive properties may also be affected by migration of plasticizers or low molecular weight components between the adhesive and organic film facing. Accordingly, organic film facings must be selected with great care, even in the case of films of single polymers since the polymers may differ from each other in molecular weight distribution.

Metallic foil, such a aluminum foil, is not a satisfactory facing member, but for reasons other than the migration problems attendant with polymeric films. Aluminum foil is difficultly strippable from the pressure-sensitive adhesive surfaces, requiring a stripping force of from about 30 to 35 ounces per inch width to strip a 1.5 mil foil from the adhesive surface when stripped therefrom by peeling the foil from the adhesive surface at an angle of about 180°. Furthermore, aluminum foil is difficult to handle in production machinery. Thin, flexible aluminum foil wrinkles easily, forming crease lines. These crease lines are unsightly and moreover apparently weaken the foil along the creases. It has been observed that the aluminum foil tears or breaks along the crease line during stripping of the foil from the adhesive. The aluminum foil tends to become nicked along the longitudinal edges when the foil is cut to the size of a facing member. When the nicked point is reached during the act of stripping the foil from the adhesive, the foil tears in the direction of the nick, generally transversely to the width of the tape.

Reinforcement of aluminum foil by lamination to paper sheeting and plastic film has not proven satisfactory for consistent production of high quality faced bandages. In a number of instances, too great to be tolerated, the foil delaminated from the reinforcing lamina of paper or film during stripping of the laminated facing member from the tape. Delamination varied from complete separation of foil from the paper or film to spot delamination. In spot delamination small portions of foil rupture and transfer the surface of the adhesive. Tearing has also been encountered in the case of facings made from foil laminated to paper. Tearing often-times occurred along the crease line formed by folding the facing member back upon itself to form a tab for grasping the facing, usually in the region over the absorbent pad. As in the case of aluminum foil itself, it is difficult to cut the foil/paper laminates without making nicks along the cut edge. These nicks act as tear points from which tearing of the strip is propagated as the facing is stripped from the adhesive.

In accordance with this invention the disadvantages encountered in the use of the aforedescribed facing members are avoided. The facing members of the adhesive bandages of this invention comprises an organic film on at least one surface of which is deposited a firmly bonded metallic coating. The metallic coating is micro-thin, no greater than 10 millionths of an inch thick, and preferably from about 2.5 to 5 millionths of an inch thick. The facing members are placed upon the adhesive surface with the metallic coating in direct contact with the adhesive surface. The metallic coating, interposed between the adhesive layer and the film, acts as a migration barrier between the adhesive and film. Surprisingly, the force required to strip an aluminum coated organic film facing member from the adhesive surface of a bandage is substantially less than that required to strip an aluminum foil facing from the adhesive. Unlike the aforedescribed laminates with the preformed foil, the metallic coating does not delaminate from the film.

The coating is formed on a surface of the organic film, pretreated as subsequently described, by the process of vacuum metalizing. Vacuum metalizing is a well known process in which surfaces are coated with metal by exposing them to the vapor of metal that has been evaporated under vacuum. The vacuum in the chamber in which the process is conducted is usually about one millionth or less of normal atmospheric pressure. The metal is heated in an open container in the chamber to a temperature at least sufficient to vaporize the metal at the pressure of the vacuum. The film is positioned above the container with the pretreated surface toward the metal. The vapor condenses upon the pretreated surface, thereby becoming metalized with a coating of the metal. The thickness of the coating is determined by the distance between the container and pretreated surface of the film, the temperature employed to evaporate the metal and the time of exposure of the film to the vaporized metal.

It has been found necessary to pretreat the surface of the film in order to avoid delamination of the metallic coating during stripping the metalized film from the adhesive. The surface pretreatment is of the type heretofore employed to improve the adherence of organic materials to plastic surfaces. The treatment is believed to involve surface oxidation of the plastic and shall be referred to herein as a surface oxidizing treatment. The treated surface for convenience shall be referred to as the oxidized surface. Two methods suitable for treating the surface of the films component of the facings of this invention are the hot gas method and the electrostatic discharge method of treating plastic surfaces. The former method is disclosed in Kreidl U.S. Patent 2,632,921 and Kritchever U.S. Patent 2,648,097. An electrostatic discharge method is taught in Traver U.S. Patent 3,018,189.

*Example 1*

An adhesive tape was prepared consisting of a plasticized polyvinylchloride film coated with a layer of a pressure-sensitive adhesive. The polyvinylchloride polymer was plasticized with a mixture of a sebacic acid polyester and an epoxidized soybean oil. Appropriate amounts of conventional light and heat stabilizers, fillers and pigments, to impart a flesh color thereto, were added to the polymer. The film was about 0.002" thick.

The film backing was coated with the following pressure-sensitive adhesive from a heptane solution thereof.

| Ingredients: | Parts by weight |
| --- | --- |
| Pale crepe rubber | 76.5 |
| Tackifier resins | 78.0 |
| Fillers | 70.8 |
| Age resistors | 1.6 |

The tackifier resins consisted of a glycerol ester of hydrogenated rosin, dimerized abietic acid and pentaerythritol ester of hydrogenated rosin. The age resistors consisted of polymerized trimethyl dihydroquinoline, diorthoethylene diamine and a condensation product of acetone and aniline. The adhesive layer was about 0.002" thick.

The adhesive tape several yards in length and three inches in width was fed into an adhesive bandage assembly machine wherein absorbent pads were placed on the adhesive surface of the tape substantially medially of the longitudinal edges of the tape and spaced from each other so that individual tapes about ¾" wide, each with a pad could be cut therefrom. Each pad was approximately 1" long and ⅝" wide, leaving approximately equal portions of the tape extending beyond the width edges of the pad. After the pads were assembled on the uncut tape, two lengths of metalized high density polyethylene film, one partly overlapping the other along their longitudinal edges were pressed upon the surface of the adhesive on the portions of the tape extending beyond the edges of the pads. The metallic coating was in contact with the adhesive surface. The total width of the overlapped lengths of metalized films was slightly greater than three inches. The end underlying portion of the metalized film was folded back upon itself to provide a tab. Adhesive bandages measuring about 3" by ¾" were then cut therefrom by cutting through the metalized facing and the adhesive tape along lines transverse to the width of the tape in the spaces between the pads assembled on the tape.

The metalized film facing members in this example were made by depositing an aluminum coating on an electrostatic discharge treated surface of the high density polyethylene film from a vapor of aluminum evaporated under vacuum. The polyethylene had a density within the range of about 0.94 to 0.98. The polyethylene film was about 0.002" thick. The aluminum coating, at least the surface of which contained aluminum oxide as to be expected, was 0.000003" thick.

The bandages were individually packaged in a paper wrapper. The packaged bandages were sterilized in an ethylene oxide sterilization system at a temperature of about 140°–150° F. and pressure of about 15 p.s.i. gauge. The force necessary to remove the vacuum metalized film facing members by stripping the members from the adhesive at a peel angle of about 180° to the tape at a stripping rate of 12" per minute was measured about one day after sterilization and after about 3 months shelf storage at ordinary room temperatures. The initial stripping force averaged 22.6 ounces per inch width. After 3 months ageing the stripping force averaged 22.1 ounces per inch width.

*Example 2*

A perforated adhesive tape was prepared in which the facing members, tape and absorbent pads were the same as described in Example 1. The adhesive tape, prior to assembly into bandages as described above, was perforated in the manner described in Schaar U.S. Patent 3,073,304 under substantially the same conditions set forth in the second example of that patent, except that the tape was perforated with about 825 holes per square inch of tape. The metalized high density polyethylene facings were readily stripped from the perforated adhesive surfaces with an average of about 18.5 ounces per inch width force initially and about 18.8 ounces per inch width force after 3 months' storage at room temperatures.

Delamination, rupture or transfer of the aluminum coating to the adhesive does not occur provided the vacuum metalized surface of the polyethylene film is pretreated as explained above. The facing members did not tear during removal and neither the tape nor the facing were distorted after removal of the facings from the tape.

*Example 3*

Bandages were prepared in accordance with Example 1 except that the facing material was vacuum metalized low density polyethylene film. The metal was aluminum, deposited as a coating 0.000003" thick. The film was about 0.002" thick. The surface of the film was not treated as described above. Flecks of the aluminum coating transferred to the adhesive surface upon removal of these facings. Occasionally the metallized film stretched during removal.

*Example 4*

Adhesive bandages were prepared as described in Example 2, except that the facing material was vacuum metalized polyethyleneterephthalate film. The metal was aluminum. The metallic coating was approximately 0.000003" thick. The film surface upon which the metallic coating was deposited was electrostatically treated to improve bonding of the coating thereto. The film was a biaxially oriented film about 0.0005" thick. The force required to strip these facing members from the adhesive initially and after one and three months storage at room temperatures were 23.2, 21.3 and 21.3 ounces per inch width, respectively.

The film component of the facings may be a film of any organic material. The film should have sufficient strength to withstand the force required to remove the facing from the adhesive surface. As a practical matter the micro-thin metallic coating does not reinforce the film. The tendency of the facing member of Example 3 to stretch can be avoided by employing a thicker film of low density polyethylene. Alternatively reinforcing fillers may be blended with the organic materials to strengthen thin films thereof. Orientation can also increase the tensile strength of films, as is known. If desired, paper, woven sheets, or non-woven sheets of various materials may be laminated to the back surface of the film. The back surface of the film may also be metallized.

The film material need not be restricted to those that are inert to the adhesive. The polymeric material from which the film is made may be plasticized with plasticizers without regard to the effect the plasticizer would otherwise have on the adhesive if the film were in direct contact with the adhesive. The polymer from which the film component is made may be a self-plasticized polymer, e.g., a polymer containing low molecular weight fractions which have the same elemental composition as the polymer.

Examples of polymers suitable for use as the film component of the metalized facing are the linear, crystalline polyalkenes, such as low density polyethylene, high density polyethylene, and stereo-regular poly-alpha alkenes such as stereo-regular polypropylene and poly-alpha-butene; polyesters of polycarboxylic acids and glycols, such as polyethylene terephthalate; vinyl resins; and polystyrene.

The preferred facing members are those which are flexible. By flexible is meant that the facing bends when the tape is held by the fingers of one hand and the facing member is held by the other hand and the tape and facing are pulled apart from each other. The facing is not flexible if when the tape and facing are pulled from each other the end of the tape is forced back on itself and the facing remains unbent. The bend in the preferred facing members at the region of separation from the adhesive surface during removal should have a radius of curvature greater than the radius of curvature of the bend of 0.0015" thick aluminum foil during removal from the tape.

The metallic coating may be formed by vacuum metalization of metal which forms a coating that is inert to the pressure-sensitive adhesive. Suitable metals include, for example, tin, silver, gold and nickel, in addition to aluminum. Copper, manganese and cobalt metallic surfaces may deleteriously affect the adhesive and are not recommended unless the adhesive is formulated for stability toward these metals. The ingredients incorporated in the adhesive to inhibit the action of these surfaces on the adhesive must, of course, be non-toxic. If the organic side of the metalized film is placed against the adhesive mass and the film is of polyethylene or similar low release material, the lower specific adhesion will provide a facing which is more easily removed prior to use than if the metalized surface is in contact with the adhesive mass. There is then no barrier between the film and the mass and plasticizers and other components of the mass can migrate into the facing film. However, the metallic coating in this instance may protect the adhesive against external gases and light rays that might otherwise pass through the non-metalized film.

The invention claimed is:

1. An adhesive bandage comprising an absorbent pad secured to one side of a flexible backing member, said backing member extending beyond edges of said pad, the extensions of said backing having a pressure-sensitive adhesive surface on said one side thereof, and at least one protective facing member in covering contact with said adhesive surface and strippable therefrom, said facing member comprising an organic film and a thin metallic coating deposited on an oxidized surface of said film from a vapor of metal evaporated under vacuum, said facing member positioned on said adhesive surface with the metallic coating interposed between the adhesive layer and said film.

2. An adhesive bandage comprising an absorbent pad secured to one side of a flexible backing member, said backing member extending beyond edges of said pad, the extensions of said backing having a pressure-sensitive adhesive surface on said one side thereof, and at least one protective facing member in covering contact with said adhesive surface and strippable therefrom, said facing member comprising an organic film and a micro-thin metallic coating deposited on an electrostatically treated surface of said film from a vapor of metal evaporated under vacuum, said facing member positioned on said adhesive surface with the metallic coating interposed between the adhesive layer and said film.

3. An adhesive bandage in accordance with claim 2 wherein said metal is aluminum.

4. An adhesive bandage in accordance with claim 2 wherein said metal is aluminum and the thickness of said coating is no greater than 0.000010".

5. An adhesive bandage in accordance with claim 2 wherein said organic film is a film of high density polyethylene having a thickness of at least 0.001", said metal is aluminum and the thickness of said coating is no greater than 0.000010".

6. An adhesive bandage comprising an absorbent pad secured to one side of a flexible backing member, said backing member extending beyond edges of said pad, the extensions of said backing having a pressure-sensitive adhesive surface on said one side thereof, and at least one protective facing member in covering contact with said adhesive surface and strippable therefrom, said facing member comprising an organic film and a micro-thin metallic coating deposited on a flame treated surface of said film from a vapor of metal evaporated under vacuum, said facing member positioned on said adhesive surface with the metallic coating interposed between the adhesive layer and said film.

7. An adhesive bandage in accordance with claim 6 wherein said metal is aluminum.

8. An adhesive bandage in accordance with claim 6 wherein said metal is aluminum and the thickness of said coating is no greater than 0.000010".

9. An adhesive bandage in accordance with claim 6 wherein said organic film is a film of high density polyethylene having a thickness of at least 0.001", said metal is aluminum and the thickness of said coating is no greater than 0.000010".

References Cited by the Examiner

UNITED STATES PATENTS

| | | | |
|---|---|---|---|
| 2,632,921 | 3/1953 | Kreidl | 117—38 |
| 2,648,097 | 8/1953 | Kritchever | 117—38 |
| 2,734,503 | 2/1956 | Doyle | 128—156 |
| 2,755,800 | 7/1956 | Thompson | 128—155 |
| 2,877,141 | 3/1959 | Shelley | 117—122 |

ADELE M. EAGER, *Primary Examiner.*